United States Patent [19]
Ogden et al.

[11] Patent Number: 5,655,141
[45] Date of Patent: Aug. 5, 1997

[54] METHOD AND SYSTEM FOR STORING INFORMATION IN A PROCESSING SYSTEM

[75] Inventors: Aubrey Deene Ogden; Neil Ray Vanderschaaf, both of Round Rock, Tex.

[73] Assignee: International Business Machines Corporation, Armonk, N.Y.

[21] Appl. No.: 704,034

[22] Filed: Aug. 28, 1996

Related U.S. Application Data

[63] Continuation of Ser. No. 108,346, Aug. 18, 1993.

[51] Int. Cl.$^6$ .................................................. G06F 9/30
[52] U.S. Cl. .................... 395/800.23; 395/376; 395/427; 395/674
[58] Field of Search ........................... 395/800, 427, 395/376, 725; 364/DIG. 1; 370/60

[56] References Cited

U.S. PATENT DOCUMENTS

| | | | |
|---|---|---|---|
| 4,152,763 | 5/1979 | Shimoi | 395/375 |
| 4,542,479 | 9/1985 | Kamimura et al. | 364/DIG. 2 |
| 4,574,349 | 3/1986 | Rechtschaffen | 364/DIG. 1 |
| 4,760,520 | 7/1988 | Shintani et al. | 364/DIG. 1 |
| 4,901,233 | 2/1990 | Liptay | 364/DIG. 1 |
| 4,992,938 | 2/1991 | Cocke et al. | 364/DIG. 1 |
| 5,101,497 | 3/1992 | Culley et al. | 395/725 |
| 5,134,561 | 7/1992 | Liptay | 395/425 |
| 5,185,868 | 2/1993 | Tran | 395/375 |
| 5,197,132 | 3/1993 | Steely, Jr. et al. | 395/375 |
| 5,197,137 | 3/1993 | Kumar et al. | 395/375 |
| 5,280,593 | 1/1994 | Bullions, III et al. | 395/375 |
| 5,339,311 | 8/1994 | Turner | 370/60 |
| 5,345,569 | 9/1994 | Tran | 395/375 |
| 5,371,684 | 12/1994 | Iadonato et al. | 364/491 |
| 5,465,373 | 11/1995 | Kahle et al. | 395/800 |
| 5,491,829 | 2/1996 | Kau et al. | 395/800 |

OTHER PUBLICATIONS

*Superscalar Microprocessor Design*, Mike Johnson, Advanced Micro Devices Chapter 6, pp. 103–126, 1991.

Primary Examiner—Alyssa H. Bowler
Assistant Examiner—Walter D. Davis
Attorney, Agent, or Firm—Michael A. Davis, Jr.

[57] ABSTRACT

A processing system and method of operation are provided. At least one execution unit processes information of a register in response to an instruction specifying the register. Each of multiple control units selectively allocates a respective one of multiple buffers to store the information in response to the instruction.

24 Claims, 9 Drawing Sheets

METHOD AND SYSTEM FOR STORING INFORMATION IN A PROCESSING SYSTEM

This is a continuation of application Ser. No. 08/108,346 filed Aug. 18, 1993.

TECHNICAL FIELD

This patent application relates in general to systems for processing information and in particular to a processing system and method of operation.

BACKGROUND OF THE INVENTION

A superscalar processing system includes multiple execution units for simultaneously executing multiple instructions. In some processing systems, instructions are executable out-of-order relative to their programmed sequence within the instruction stream. Accordingly, instructions' results are not necessarily available in-order of the instructions' programmed sequence. Nevertheless, some of these processing systems are designed to write instructions' results back to architectural registers in-order of the instructions' programmed sequence.

For this reason, some processing systems include rename buffers for intermediately storing instructions' results until a suitable moment for writing the intermediately stored results back to architectural registers. Previous techniques have been developed for controlling a processing system's rename buffers to accommodate data dependencies between the executed instructions. Nevertheless, shortcomings of such previous techniques include relatively slow speed, high complexity, and large physical size of systems implementing the techniques. With slow speed, high complexity, and large physical size, such systems are poorly suited for use in advanced integrated circuit microprocessors.

Thus, a need has arisen for a processing system and method of operation, in which speed of a system for controlling rename buffers is increased relative to previous techniques. Also, a need has arisen for a processing system and method of operation, in which complexity of a system for controlling rename buffers is decreased relative to previous techniques. Further, a need has arisen for a processing system and method of operation, in which physical size of a system for controlling rename buffers is decreased relative to previous techniques. Moreover, a need has arisen for a processing system and method of operation, in which a system for controlling rename buffers is more suited for use in advanced integrated circuit microprocessors relative to previous techniques.

SUMMARY OF THE INVENTION

In a processing system and method of operation, at least one execution unit processes information of a register in response to an instruction specifying the register. Each of multiple control units selectively allocates a respective one of multiple buffers to store the information in response to the instruction.

It is a technical advantage of the present invention that speed of a system for controlling rename buffers is increased relative to previous techniques.

It is another technical advantage of the present invention that complexity of a system for controlling rename buffers is decreased relative to previous techniques.

It is a further technical advantage of the present invention that physical size of a system for controlling rename buffers is decreased relative to previous techniques.

It is yet another technical advantage of the present invention that a system for controlling rename buffers is more suited for use in advanced integrated circuit microprocessors relative to previous techniques.

BRIEF DESCRIPTION OF THE DRAWINGS

An exemplary embodiment of the present invention and its advantages are better understood by referring to the following descriptions and accompanying drawings, in which.

DETAILED DESCRIPTION

An exemplary embodiment of the present invention and its advantages are better understood by referring to FIGS. 1–11 of the drawings, like numerals being used for like and corresponding parts of the accompanying drawings.

Figure 1:
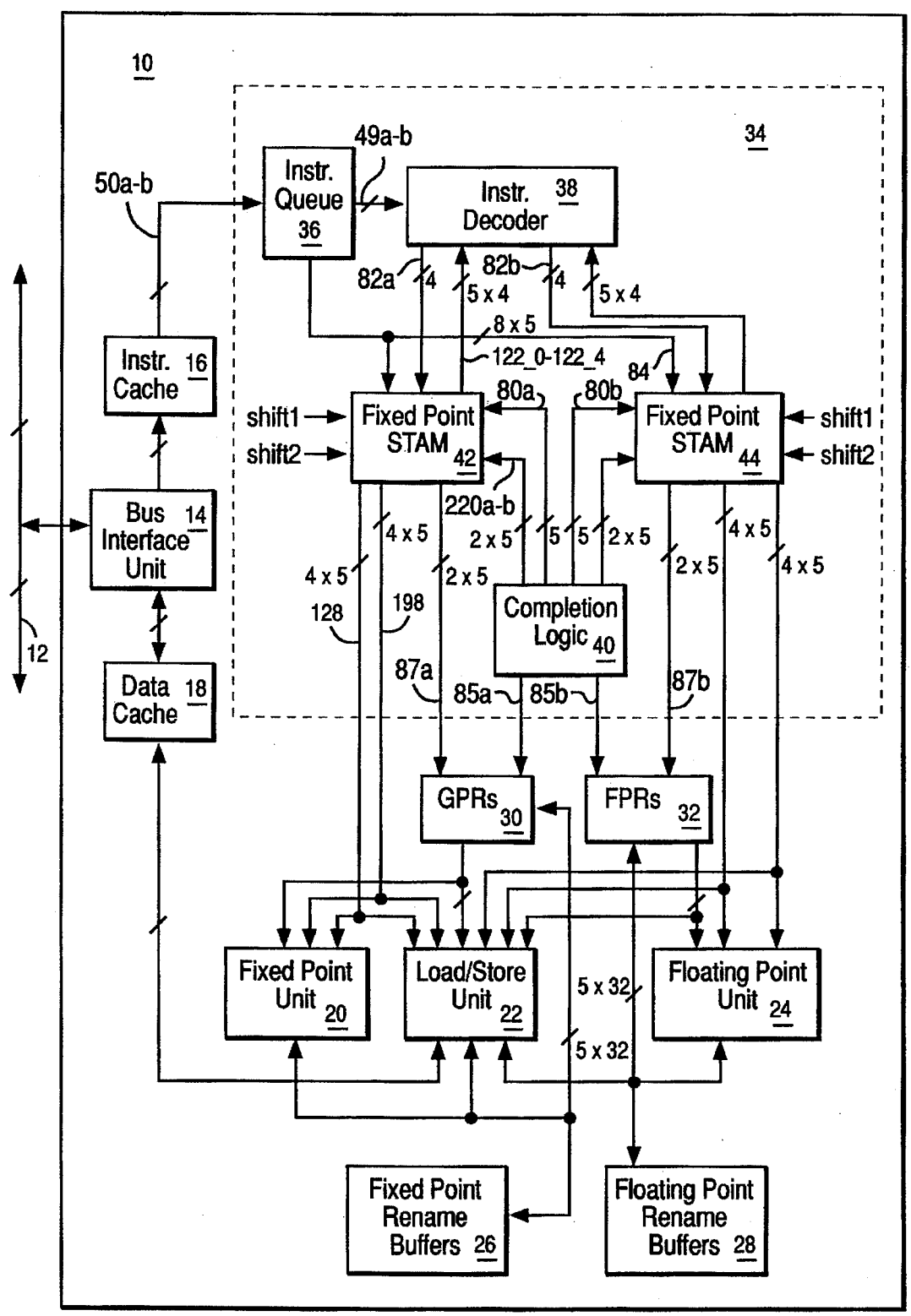
FIG. 1 is a block diagram of a processing system according to the preferred embodiment.

FIG. 1 is a block diagram of a processing system 10 according to the preferred embodiment. In the preferred embodiment, system 10 is an integrated circuit superscalar microprocessor. System 10 is connected to a system bus 12.

System 10 includes a bus interface unit ("BIU") 14, an instruction cache 16, and a data cache 18. Moreover, system 10 includes a fixed point unit 20, a load/store unit 22, and a floating point unit 24. Also, system 10 includes fixed point rename buffers 26, floating point rename buffers 28, general purpose architectural registers ("GPR's") 30, and floating point architectural registers ("FPR's") 32.

Further, system 10 includes a control section, indicated by dashed enclosure 34. Control section 34 includes an instruction queue 36, an instruction decoder 38, and completion logic 40. In a significant aspect of the preferred embodiment, control section 34 further includes a fixed point source determining, tag assigning, allocating and deallocating memory ("STAM") 42 and a floating point STAM 44.

As discussed further hereinbelow in connection with FIG. 5, STAM 42 advantageously includes multiple identical cascadable rename buffer control units BFR0, BFR1, BFR2, BFR3 and BFR4. Control unit BFR0 is associated with physical rename buffer 0 (FIG. 2) of fixed point rename buffers 26. Accordingly, in a significant aspect of the preferred embodiment, control unit BFR0 controls whether rename buffer 0 stores data for any of GPR's 30. Likewise, control units BFR1–BFR4 are associated with physical rename buffers 1–4, respectively.

Figure 5A:
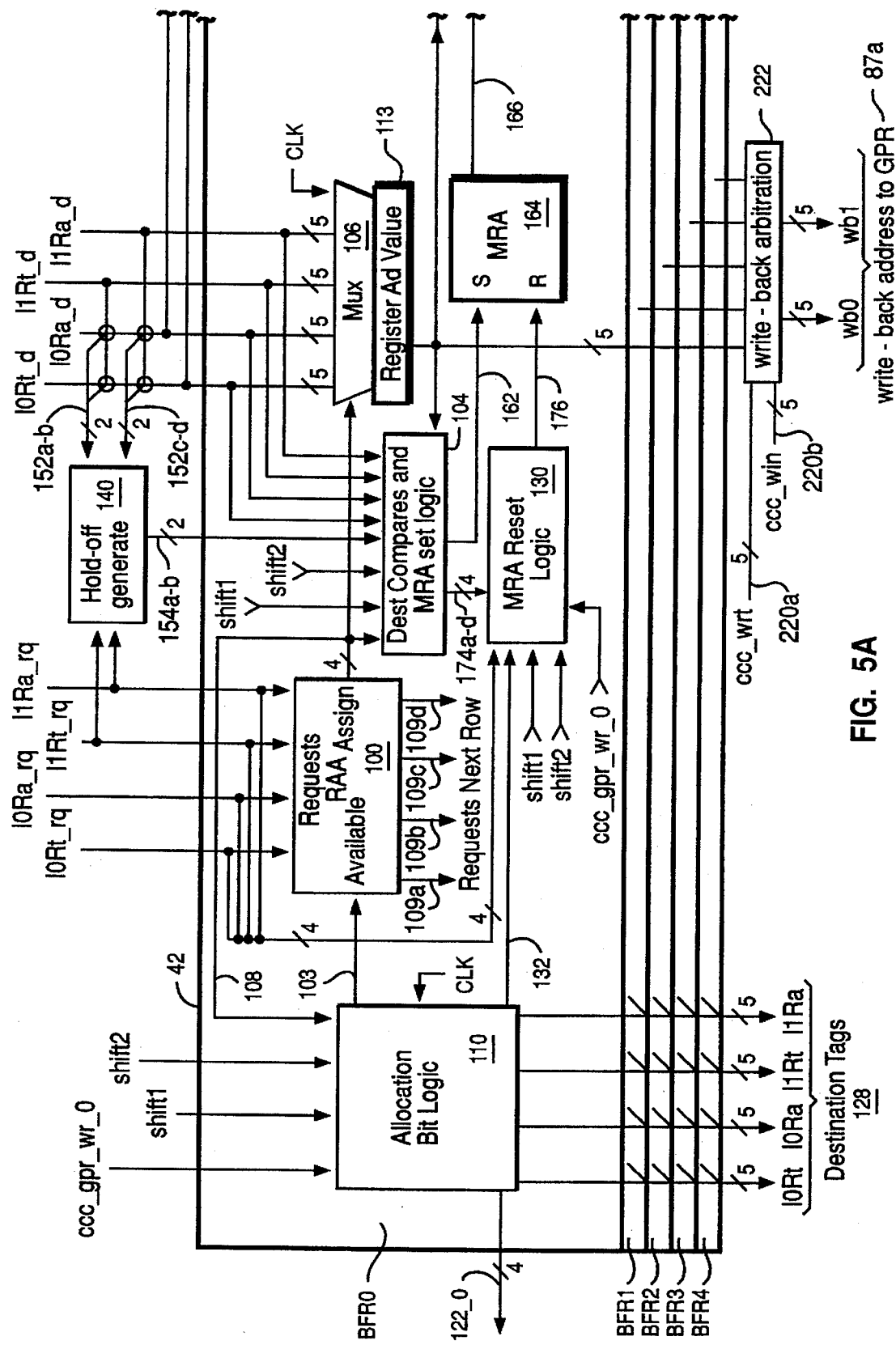
FIG. 5 is a block diagram of a source determining, tag assigning, allocating and deallocating memory ("STAM") of the system of FIG. 1.
Figure 5B:
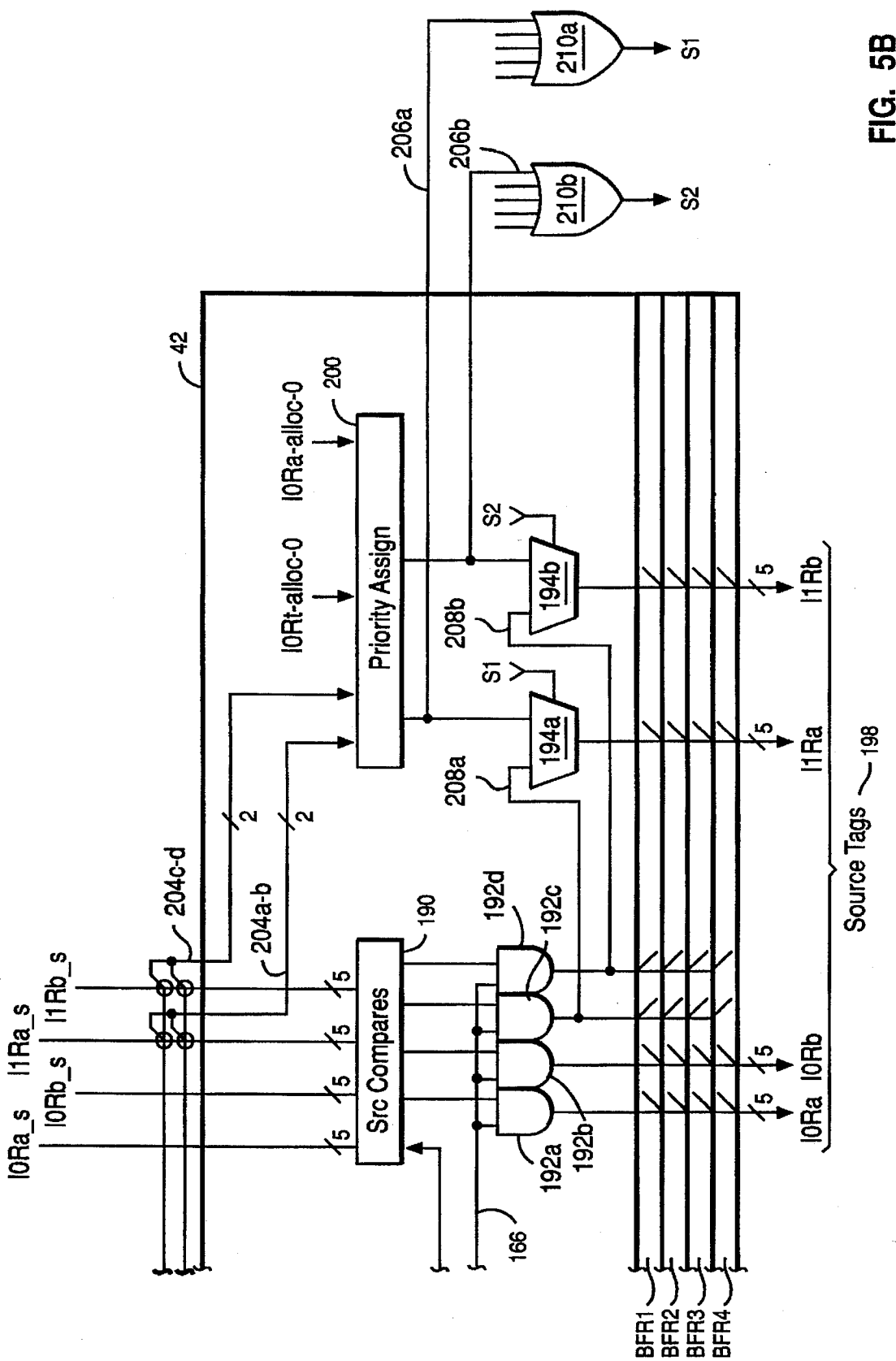

Control units BFR0–BFR4 are connected in a cascaded manner as shown in FIG. 5. Notably, if rename buffers 26 includes only one rename buffer, then STAM 42 includes only control unit BFR0. Similarly, if rename buffers 26 include more than five rename buffers, then each additional rename buffer has a respectively associated additional control unit (in addition to control units BFR0–BFR4 and identical to control unit BFR0) within STAM 42. Each such additional control unit is added to STAM 42 by connecting in a cascaded manner in series beginning at control unit BFR4.

Significantly, control units BFR0–BFR4 are cascadably connectable and are respectively associated with physical rename buffers 0–4. Such a modularized cascadable structure facilitates formation of simulation source files, layout of semiconductor fabrication plans, scalability of designs, adaptability to various processing systems, and usefulness as part of a library of reusable component designs. Accordingly, circuitry of STAM 42 is more suited for use in advanced integrated circuit microprocessors (such as superscalar microprocessor 10 of FIG. 1) relative to previous techniques for controlling rename buffers. Moreover, circuitry of STAM 42 has decreased complexity and decreased physical size relative to previous techniques for controlling rename buffers. Further, circuitry of STAM 42 has increased speed relative to previous techniques for controlling rename buffers.

Referring to FIG. 1, system 10 outputs and inputs information to and from system bus 12 through bus interface unit 14. Such information includes instructions and data. Instruction cache 16 stores instructions input through bus interface unit 14 from system bus 12. Data cache 18 stores data input through bus interface unit 14 from system bus 12. Moreover, bus interface unit 14 inputs stored data from data cache 18 and outputs such data to system bus 12.

Load/store unit 22 transfers data from data cache 18 to GPR's 30 through fixed point rename buffers 26. Moreover, load/store unit 22 transfers data from data cache 18 to FPR's 32 through floating point rename buffers 28. Further, load/store unit 22 transfers data from GPR's 30 to data cache 18 and from FPR's 32 to data cache 18. Load/store unit 22 executes such transfers of data between GPR's 30, FPR's 32, and data cache 18 in response to instructions decoded by instruction decoder 38 of control section Similarly, in response to instructions decoded by instruction decoder 38, fixed point unit 20 inputs data from GPR's 30, processes such data, and outputs the processed data to GPR's 30 through fixed point rename buffers 26. Also, in response to instructions decoded by instruction decoder 38, floating point unit 24 inputs data from FPR's 32, processes such data, and outputs the processed data to FPR's 32 through floating point rename buffers 28. Together, fixed point unit 20, load/store unit 22, and floating point unit 24 form execution units of system 10. For clarity, FIG. 1 does not show connections from instruction decoder 38 to the execution units.

As previously mentioned, floating point unit 24 outputs data to FPR's 32 through floating point rename buffers 28. For example, floating point unit 24 modifies data for a particular one of FPR's 32 and stores such modified data in floating point rename buffers 28. Later, in response to a write-back signal on line 85b from completion logic 40 and a write-back address on lines 87b from floating point STAM 44, such modified data are written back to the particular FPR from floating point rename buffers 28.

Floating point unit 24 is able to input data from floating point rename buffers 28 and accordingly is able to modify data for the particular FPR more than once before such modified data are written back to the particular FPR from floating point rename buffers 28. In such a situation, multiple ones of floating point rename buffers 28 store data for the particular FPR. As discussed further hereinbelow in connection with FIGS. 5–11, floating point STAM 44 monitors which of floating point rename buffers 28 stores the most recent version of data for the particular FPR. In response to a write-back signal from completion logic 40 and a write-back address from floating point STAM 44, data from only one of floating point rename buffers 28 are written back to the particular FPR at any one time.

In a comparable manner, data are transferred between load/store unit 22, FPR's 32, and floating point rename buffers 28, responsive to indications from floating point STAM 44. Moreover, in a comparable manner, data are transferred between load/store unit 22, GPR's 30, and fixed point rename buffers 26, responsive to indications from fixed point STAM 42. Also, in a comparable manner, data are transferred between fixed point unit 20, GPR's 30, and fixed point rename buffers 26, responsive to indications from fixed point STAM 42.

In a significant aspect of the preferred embodiment, fixed point STAM 42 controls whether a particular one of fixed point rename buffers 26 stores data for a particular one of GPR's 30. Similarly, floating point STAM 44 controls whether a particular one of floating point rename buffers 28 stores data for a particular one of FPR's 32. Fixed point STAM 42 is representative one of STAM'S 42 and 44. Fixed point STAM 42 is discussed further hereinbelow in connection with FIGS. 5–11.

Figure 2:
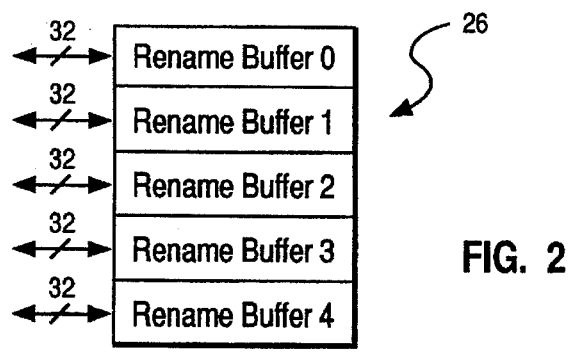
FIG. 2 is a block diagram of rename buffers of the system of FIG. 1.

FIG. 2 is a block diagram of fixed point rename buffers 26. As shown in FIG. 2, fixed point rename buffers 26 include a rename buffer 0, a rename buffer 1, a rename buffer 2, a rename buffer 3, and a rename buffer 4. In the preferred embodiment, each of rename buffers 0–4 is 32-bits wide.

Figure 3:
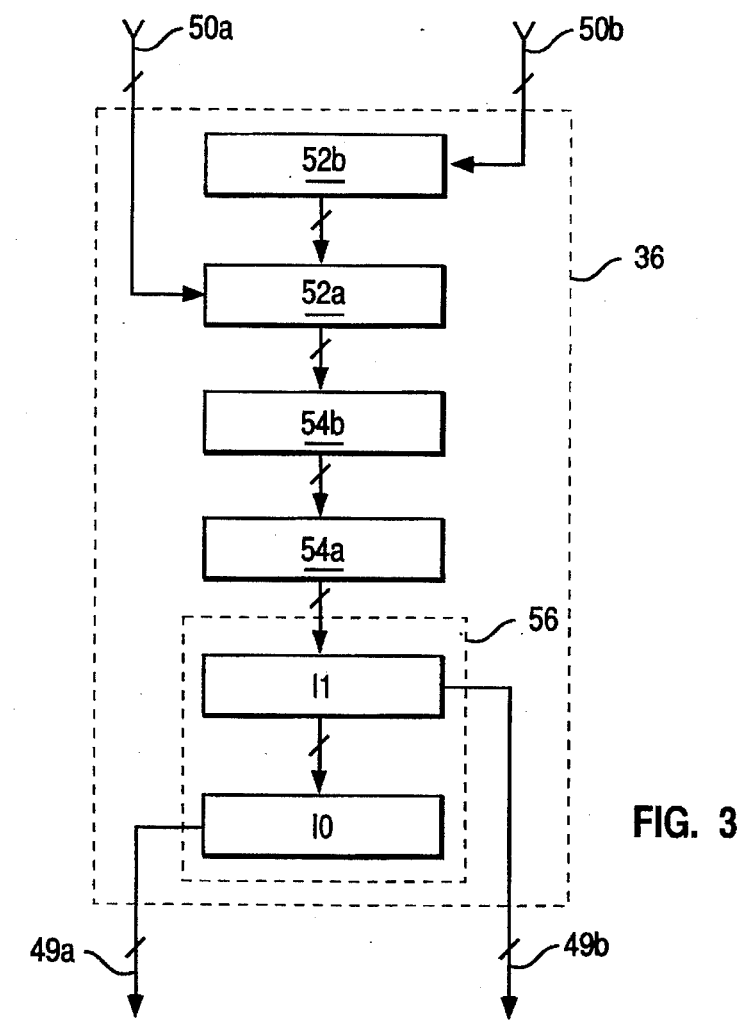
FIG. 3 is a block diagram of an instruction queue of the system of FIG. 1.

FIG. 3 is a block diagram of instruction queue 36. Instruction queue 36 stores an I0 instruction and an I1 instruction in a buffer I0 and a buffer I1, respectively, of dispatch buffers 56. In the preferred embodiment, in response to a cycle of system 10, either the I0 instruction is dispatched by itself to an execution unit, both the I0 and I1 instructions are dispatched together to respective execution units, or the I1 instruction is dispatched by itself to an execution unit. The contents of buffers I0 and I1 are output to instruction decoder 38 (FIG. 1) through lines 49a–b, respectively.

If the I0 instruction is dispatched by itself, then the shift1 signal (FIG. 1) is asserted, and the I1 instruction is dispatched in response to a later cycle of system 10. By comparison, if both the I0 and I1 instructions are dispatched together, then the shift2 signal (FIG. 1) is asserted. If the I1 instruction is dispatched by itself, then neither the shift1 signal nor the shift2 signal is asserted; the I0 instruction is dispatched in response to a later cycle of system 10, and the shift2 signal is asserted at that later cycle.

In the preferred embodiment, instruction queue 36 is able to input two instructions in parallel from instruction cache 16 through buses 50a–b, respectively. In response to assertion of the shift2 signal, instruction queue 36 transfers previously stored instructions from instruction buffers 54a–b to buffers I0 and I1, respectively. Also, instruction queue 36 transfers previously stored instructions from instruction buffers 52a–b to instructions buffers 54a–b, respectively. Moreover, instruction queue 36 inputs two instructions from instruction cache 16 through buses 50a–b and stores such instructions in instruction buffers 52a–b, respectively.

In response to assertion of the shift1 signal, instruction queue 36 transfers the previously stored instruction from buffer I1 to buffer I0. Also, instruction queue 36 transfers previously stored instructions from instruction buffer 54a to buffer I1, from instruction buffer 54b to instruction buffer 54a, from instruction buffer 52a to instruction buffer 54b, and from instruction buffer 52b to instruction buffer 52a. Moreover, instruction queue 36 inputs an instruction from instruction cache 16 through bus 50b and stores this instruction in instruction buffer 52b.

In the preferred embodiment, the I1 instruction is dispatchable to an execution unit for execution prior to the I0 instruction, even though the I0 instruction precedes the I1 instruction in their programmed sequence within the instruction stream. In such a situation, neither shift1 nor shift2 is asserted; the I0 instruction is dispatched in response to a later cycle of system 10, and the shift2 signal is asserted at that later cycle. In a significant aspect of the preferred embodiment, fixed point STAM 42 accommodates such an "out-of-order" dispatch of instructions in buffers I0 and I1.

Figure 4:
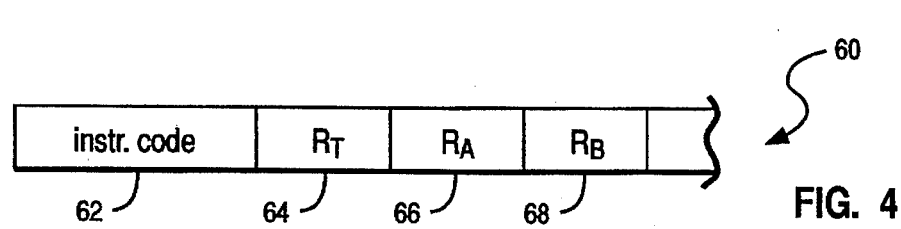
FIG. 4 is an illustration of an instruction format according to the system of FIG. 1.

FIG. 4 is an illustration of an instruction format according to system 10. FIG. 4 shows a generic instruction 60 having an instruction code field 62, an $R_T$ register field 64, an $R_A$ register field 66, and an $R_B$ register field 68. Instruction code field 62 indicates whether instruction 60 is to be executed by either fixed point unit 20, load/store unit 22, or floating point unit 24.

For example, instruction code 62 can identify instruction 60 as an ADD instruction for execution by fixed point unit 20. In response to such an instruction, fixed point unit 20 adds the contents of GPR registers $R_A$ and $R_B$ and stores the result in a selected one of fixed point rename buffers 26 in response to a destination tag from fixed point STAM 42. Advantageously, fixed point STAM 42 associates register $R_T$ with data stored in the selected one of fixed point rename buffers 26.

Later, in response to a write-back signal on line 85a from completion logic 40 and a write-back address on lines 87a from fixed point STAM 42, the associated data are written back to GPR register $R_T$ from the selected one of fixed point rename buffers 26. The write-back address indicates which of GPR's 30 is to store data input from the selected one of fixed point rename buffers 26, according to the register associated by fixed point STAM 42 with the selected one of fixed point rename buffers 26.

In the preferred embodiment, a register designated by $R_T$ register field 64 of instruction 60 is always a destination register into which a result of the instruction is to be stored. By comparison, a register designated by $R_B$ register field 68 is always a source register from which data are to be input and processed according to the instruction code designated in field 62. Depending upon the instruction code designated in field 62, a register designated by $R_A$ register field 66 is either a source register or a destination register.

FIG. 5 is a block diagram of STAM 42. In a significant aspect of the preferred embodiment, STAM 42 includes multiple identical cascadable rename buffer control units BFR0, BFR1, BFR2, BFR3 and BFR4. Control unit BFR0 is a representative one of control units BFR0–BFR4. Accordingly, for clarity, FIG. 1 shows detail of control unit BFR0 only.

Control unit BFR0 is associated with physical rename buffer 0 (FIG. 2) of fixed point rename buffers 26. Accordingly, in a significant aspect of the preferred embodiment, control unit BFR0 controls whether rename buffer 0 stores data for any of GPR's 30. Likewise, control units BFR1–BFR4 are associated with physical rename buffers 1–4, respectively.

Control units BFR0–BFR4 are connected in a cascaded manner as shown in FIG. 5. Notably, if rename buffers 26 includes only one rename buffer, then STAM 42 includes only control unit BFR0. Similarly, if rename buffers 26 include more than five rename buffers, then each additional rename buffer has a respectively associated additional control unit (in addition to control units BFR0–BFR4 and identical to control unit BFR0) within STAM 42. Each such additional control unit is added to STAM 42 by connecting in a cascaded manner in series beginning at control unit BFR4.

Referring also to FIG. 1, completion logic 40 outputs five completion lines to fixed point STAM 42 through lines 80a, namely ccc_gpr_wr_0, ccc_gpr_wr_1, ccc_gpr_wr_2, ccc_gpr_wr_3 and ccc_gpr_wr_4. Similarly, completion logic 40 outputs five completion lines to floating point STAM 44 through lines 80b (FIG. 1). Referring to FIG. 5, completion line ccc_gpr_wr_0 is associated with rename buffer 0 of fixed point rename buffers 26. Accordingly, assertion by completion logic 40 of completion line ccc_gpr_wr_0 indicates to control unit BFR0 that rename buffer 0 of fixed point rename buffers 26 is reallocatable to a different one of GPR's 30. Similarly, control unit BFR1 inputs completion line ccc_gpr_wr_1, control unit BFR2 inputs completion line ccc_gpr_wr_2, control unit BFR3 inputs completion line ccc_gpr_wr_3, and control unit BFR4 inputs completion line ccc_gpr_wr_4.

Each of control units BFR0–BFR4 inputs the shift1 line and shift2. Moreover, each of control units BFR0–BFR4 inputs request lines I0Rt_rq, I0Ra_rq, I1Rt_rq and I1Ra_rq from instruction decoder 38 through lines 82a (FIG. 1). Similarly, floating point STAM 44 inputs request lines from instruction decoder 38 through lines 82b. Instruction decoder 38 indicates to fixed point STAM 42 that an instruction in buffer I0 (FIG. 3) is a valid fixed point or load/store instruction by asserting one or more of request lines I0Rt_rq and I0Ra_rq.

For example, instruction decoder 38 asserts request line I0Rt_rq in response to a valid $R_T$ field 64 (FIG. 4) of an instruction in buffer I0 (FIG. 3) specifying one of GPR's 30 into which a result of the instruction is destined to be stored (as specified by the instruction code in field 62). Moreover, instruction decoder 38 asserts request line I0Ra_rq in response to a valid $R_A$ field 66 of an instruction in buffer I0 specifying one of GPR's 30 into which a result of the instruction is destined to be stored. Also, instruction decoder 38 asserts request line I1Rt_rq in response to a valid $R_T$ field 64 of an instruction in buffer I1 specifying one of GPR's 30 into which a result of the instruction is destined to be stored. Similarly, instruction decoder 38 asserts request line I1Ra_rq in response to a valid $R_A$ field 66 of an instruction in buffer I1 specifying one of GPR's 30 into which a result of the instruction is destined to be stored.

Fixed point STAM 42 and floating point STAM 44 input 5-bit register fields I0Rt_d, I0Ra_d, I1Rt_d, I1Ra_d, I0Ra_s, I0Rb_s, I1Ra_s and I1Rb_s from instruction queue 36 through lines 84. Referring to FIG. 5, each of control units BFR0–BFR4 inputs these 5-bit register fields. I0Rt_d is a 5-bit binary encoded register number from $R_T$ register field 64 of an instruction in buffer I0. I0Ra_d is a 5-bit binary encoded register number from $R_A$ register field 66 of an instruction in buffer I0, where register $R_A$ is a destination register into which a result of the instruction is to be stored.

I1Rt_d is a 5-bit binary encoded register number from $R_T$ register field 64 of an instruction in buffer I1. I1Ra_d is a 5-bit binary encoded register number from $R_A$ register field 66 of an instruction in buffer I1, where register $R_A$ is a destination register into which a result of the instruction is to be stored.

I0Ra_s is a 5-bit binary encoded register number from $R_A$ register field 66 of an instruction in buffer I0, where register $R_A$ is a source register from which data are to be input by the instruction. I0Rb_s is a 5-bit binary encoded register number from $R_B$ register field 68 of an instruction in buffer I0.

I1Ra_s is a 5-bit binary encoded register number from $R_A$ register field 66 of an instruction in buffer I1, where register $R_A$ is a source register from which data are to be input by the instruction. I1Rb_s is a 5-bit binary encoded register number from $R_B$ register field 68 of an instruction in buffer I1.

Figure 6:
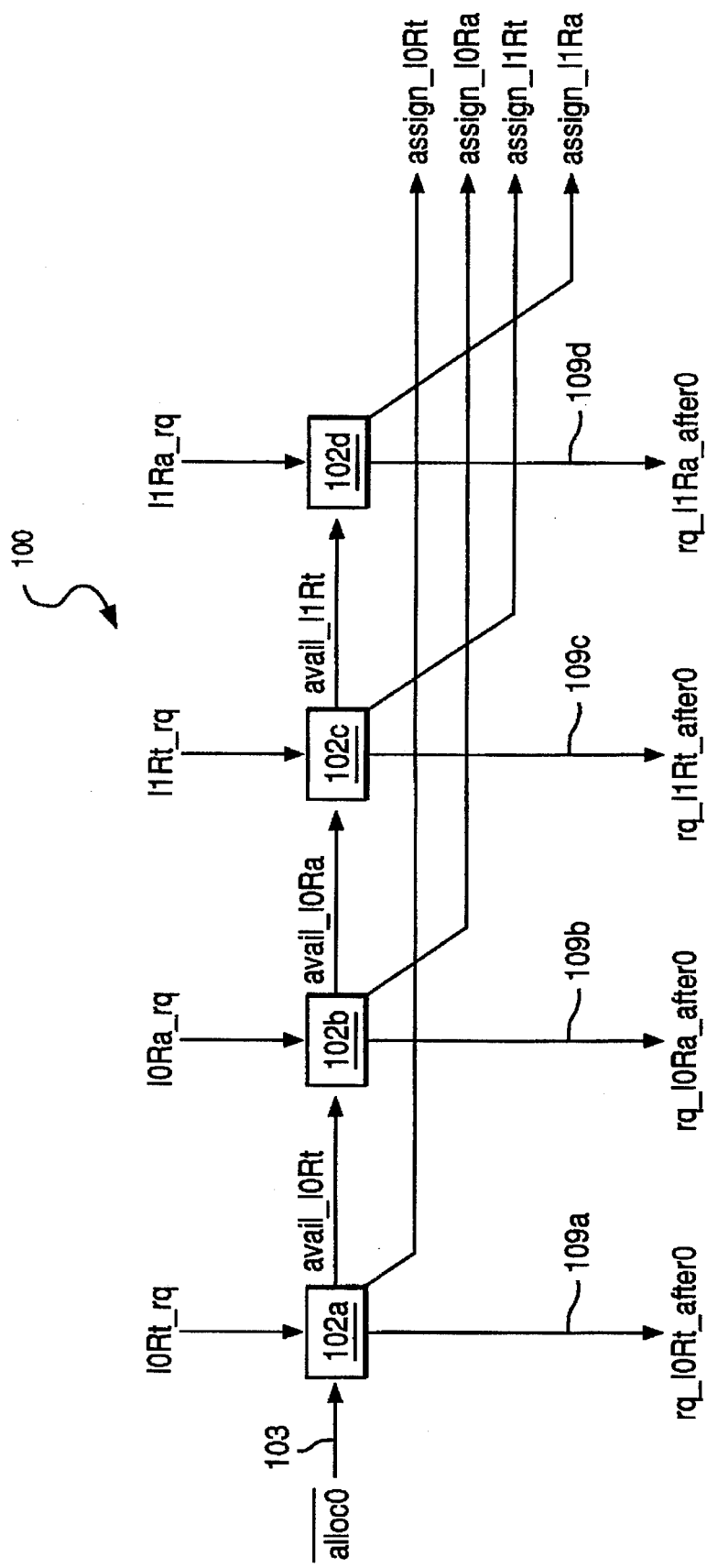
FIG. 6 is a block diagram of a resource allocation array of the STAM of FIG. 5.

FIG. 6 is a block diagram of a resource allocation array ("RAA") 100 of STAM 42. RAA 100 includes four cells 102a–d. Cell 102a inputs $\overline{alloc0}$ through a line 103. If $\overline{alloc0}$ is set (indicating rename buffer 0 is not presently allocated to a GPR) and I0Rt_rq is set (indicating the $R_T$ register field of an instruction in buffer I0 is valid), then cell 102a sets assign_I0Rt, clears avail_I0Rt, and clears rq_I0Rt_after0. If $\overline{alloc0}$ is cleared (indicating rename buffer 0 is presently allocated to a GPR), then cell 102a equates rq_I0Rt_after0 to I0Rt_rq, clears avail_I0Rt, and clears assign_I0Rt. If $\overline{alloc0}$ is set and I0Rt_rq is cleared, then cell 102a clears rq_I0Rt_after0, clears assign_I0Rt, and sets avail_I0Rt.

Referring to cell 102b, if avail_I0Rt is set (indicating rename buffer 0 is not presently allocated to a GPR) and I0Ra_rq is set (indicating the $R_A$ register field of an instruction in buffer I0 is valid), then cell 102b sets assign_I0Ra, clears avail_I0Ra, and clears rq_I0Ra_after0. If avail_I0Rt is cleared (indicating rename buffer 0 is presently allocated to a GPR), then cell 102b equates rq_I0Ra_after0 to I0Ra_rq, clears avail_I0Ra, and clears assign_I0Ra. If avail_I0Rt is set and I0Ra_rq is cleared, then cell 102b clears rq_I0Ra_after0, clears assign_I0Ra, end sets avail_I0Ra.

Referring to cell 102c, if avail_I0Ra is set (indicating rename buffer 0 is not presently allocated to a GPR) and I1Rt_rq is set (indicating the $R_T$ register field of an instruction in buffer I1 is valid), then cell 102c sets assign_I1Rt, clears avail_I1Rt, and clears rq_I1Rt_after0. If avail_I0Ra is cleared (indicating rename buffer 0 is presently allocated to a GPR), then cell 102c equates rq_I1Rt_after0 to I1Rt_rq, clears avail_I1Rt, and clears assign_I1Rt. If avail_I0Ra is set and I1Rt rq is cleared, then cell 102c clears rq_I1Rt_after0, clears assign_I1Rt, and sets avail_I1Rt.

Referring to cell 102d, if avail_I1Rt is set (indicating rename buffer 0 is not presently allocated to a GPR) and I1Ra_rq is set (indicating the $R_A$ register field of an instruction in buffer I1 is valid), then cell 102d sets assign_I1Ra and clears rq_I1Ra_after0. If avail_I1Rt is cleared (indicating rename buffer 0 is presently allocated to a GPR), then cell 102d equates rq_I1Ra_after0 to I1Ra_rq and clears assign_I1Ra. If avail_I1Rt is set and I1Ra_rq is cleared, then cell 102d clears rq_I1Ra_after0 and clears assign_I1Ra.

Referring also to FIG. 5, through lines 109a–d, the resource allocation array of control unit BFR1 inputs rq_I0Rt_after0, rq_I0Ra_after0, rq_I1Rt_after0, and rq_I1Ra_after0 in place of I0Rt_rq, I0Ra_rq, I1Rt_rq and I1Ra_rq, respectively. In this manner, control unit BFR1 is connected in series with control unit BFR0 in a cascaded fashion.

Moreover, RAA 100 outputs assign_I0Rt, assign_I0Ra, assign_I1Rt and assign_I1Ra to Destination Compares and MRA Set Logic 104, multiplexer 106, and allocation bit logic 110 through lines 108. In response to lines 108, multiplexer 106 outputs one of destination fields I0Rt_d, I0Ra_d, I1Rt_d and I1Ra_d to a register address value latch 113. At any single moment, only one of lines assign_I0Rt, assign_I0Ra, assign_I1Rt and assign_I1Ra is true.

Lines assign_I0Rt, assign_I0Ra, assign_I1Rt and assign_I1Ra are associated with destination fields I0Rt_d, I0Ra_d, I1Rt_d and I1Ra_d, respectively. For example, if assign_I0Rt=0, assign_I0Ra=0, assign_I1Rt=1, and assign_I1Ra=0, then multiplexer 106 outputs destination field I1Rt_d to register address value latch 113. In response to a positive edge transition of the clock signal on clock line CLK, register address value latch 113 latches the output destination field from multiplexer 106. Accordingly, if 5-bit destination field I1Rt_d is binary encoded to represent general purpose register number-27 of GPR's 30, then register address value latch 113 latches the binary encoded representation of 27. In this manner, control unit BFR0 associates the register number of one of GPR's 30 with allocated rename buffer 0 (FIG. 2) of fixed point rename buffers 26.

Figure 7:
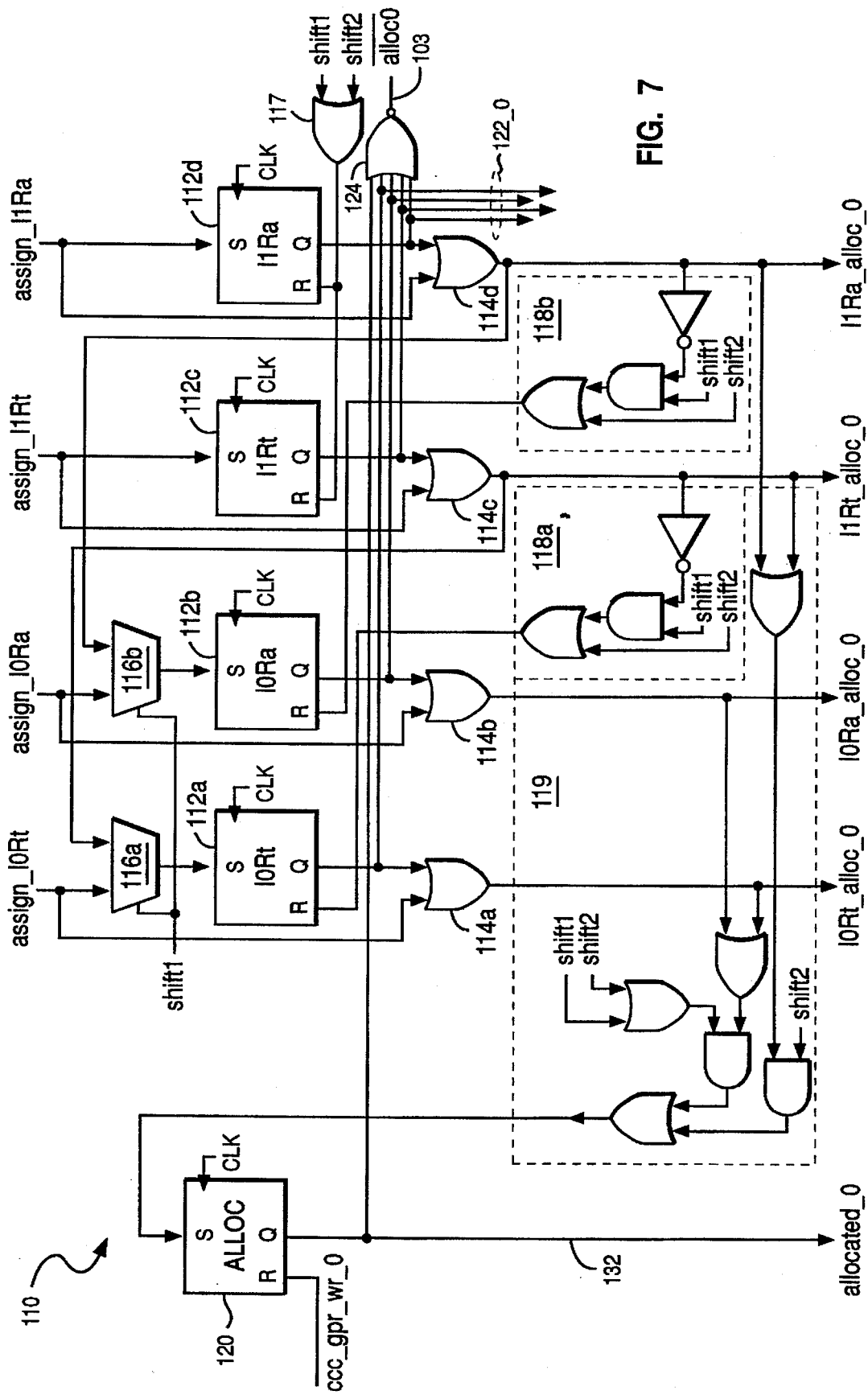
FIG. 7 is a schematic electrical circuit diagram of allocation bit logic of the STAM of FIG. 5.

FIG. 7 is a schematic electrical circuit diagram of allocation bit logic 110 of STAM 42. Allocation bit logic 110 includes latches 112a–d and OR-gates 114a–d. Together, the outputs of OR-gates 114a–d form I0Rt_alloc_0, I0Ra_alloc_0, I1Rt_alloc_0 and I1Ra_alloc_0, respectively.

If assign_I0Rt is true, then I0Rt_alloc_0 is true. Similarly, if assign_I0Ra is true, then I0Ra_alloc_0 is true. Also, if assign_I1Rt is true, then I1Rt_alloc_0 is true. Moreover, if assign_I1Ra is true, then I1Ra_alloc_0 is true.

If shift1 is false, then the outputs of multiplexers 116a–b are equal to assign_I0Rt and assign_I0Ra, respectively. Otherwise, if shift1 is true, then the outputs of multiplexers 116a–b are equal to I1Rt_alloc_0 and I1Ra_alloc_0, respectively. In this manner, if shift1 is true (such that the I1 instruction is moved into buffer I0 as discussed further hereinabove in connection with FIG. 3), then the states of I1Rt_alloc_0 and I1Ra_alloc_0 are preserved by copying I1Rt_alloc_0 and I1Ra_alloc_0 to the outputs of multiplexers 116a–b, respectively.

By preserving the states of I1Rt_alloc_0 and I1Ra_alloc_0, fixed point STAM 42 advantageously accommodates a situation where the I1 instruction is dispatched to an execution unit "out-of-order" prior to the I0 instruction, as discussed further hereinabove in connection with FIG. 3. Such preservation is important because rename buffer 0 (FIG. 2) is subject to being allocated by control unit BFR0 in response to the previously dispatched I1 instruction, and such allocation is indicated by the states of I1Rt_alloc_0 and I1Ra_alloc_0.

If the output of multiplexer 116a is true, then the output of latch 112a is set in response to a positive edge transition of a clock signal on clock line CLK, so that I0Rt_alloc_0 is latched true. Similarly, if the output of multiplexer 116b is true, then the output of latch 112b is set in response to a positive edge transition of the clock signal on clock line CLK, so that I0Ra_alloc_0 is latched true. Also, if assign_ I1Rt is true, then the output of latch 112c is set in response to a positive edge transition of the clock signal on clock line CLK, so that I1Rt_alloc_0 is latched true. Moreover, if assign_I1Ra is true, then the output of latch 112d is set in response to a positive edge transition of the clock signal on clock line CLK, so that I1Ra_alloc_0 is latched true. As previously mentioned, only one of lines assign_I0Rt, assign_I0Ra, assign_I1Rt and assign_I1Ra is true at any single moment.

If assign_I0Rt is false and the output of latch 112a is false, then I0Rt_alloc_0 is false. Similarly, if assign_I0Ra is false and the output of latch 112b is false, then I0Ra_ alloc_0 is false. Also, if assign_I1Rt is false and the output of latch 112c is false, then I1Rt_alloc_0 is false. Moreover, if assign_I1Ra is false and the output of latch 112d is false, then I1Ra_alloc_0 is false.

Referring to OR gate 117, if either shift1 or shift2 is true, then the outputs of latches 112c–d are cleared in response to a positive edge transition of a clock signal on clock line CLK. Referring to logic indicated by dashed enclosures 118a–b, if shift2 is true, then the outputs of latches 112a–b are cleared in response to a positive edge transition of the clock signal on clock line CLK.

Referring to logic 118a, if shift1 is true and I1Rt_alloc_0 is false, then the output of latch 112a is cleared in response to a positive edge transition of the clock signal on clock line CLK. Referring to logic 118b, if shift1 is true and I1Ra_ alloc_0 is false, then the output of latch 112b is cleared in response to a positive edge transition of the clock signal on clock line CLK. In this manner, if shift1 is true (such that the I1 instruction is moved into buffer I0 as discussed further hereinabove in connection with FIG. 3), then the states of I1Rt_alloc_0 and I1Ra_alloc_0 are preserved by copying I1Rt_alloc_0 and I1Ra_alloc_0 to the outputs of latches 112a–b, respectively.

If any of I0Rt_alloc_0, I0Ra_alloc_0, I1Rt_alloc_0, or I1Ra_alloc_0 is true, then rename buffer 0 is allocated to one of GPR's 30 by control unit BFR0. At any single moment, only one of lines I0Rt_alloc_0, I0Ra_alloc_0, I1Rt_alloc_0 and I1Ra_alloc_0 is true. Referring to logic indicated by dashed enclosure 119, if shift2 is asserted, then latch 120 sets allocated_0 in response to a positive edge transition of the clock signal on clock line CLK if either I0Rt_alloc_0, I0Ra_alloc_0, I1Rt_alloc_0, or I1Ra_ alloc_0 is true.

By comparison, if shift1 is asserted, then latch 120 sets allocated_0 in response to a positive edge transition of the clock signal on clock line CLK if either I0Rt_alloc_0 or I0Ra_alloc_0 is true. Moreover, if shift1 is asserted, then the states of I1Rt_alloc_0 and I1Ra_alloc_0 are preserved by copying I1Rt_alloc_0 and I1Ra_alloc_0 to the outputs of latches 112a–b, respectively.

Accordingly, allocated_0 indicates to MRA reset logic 130 (through a line 132 shown in FIG. 5) whether rename buffer 0 is allocated in response to a dispatched instruction. If allocated_0 is true, then rename buffer 0 (FIG. 2) is allocated to store data for a particular one of GPR's 30 as specified by a dispatched instruction. The particular GPR's number is latched by register address value latch 113 of control unit BFR0, as discussed further hereinabove in connection with register address value latch 113. If ccc_ gpr_wr_0 is true, then latch 120 clears allocated_0 in response to a positive edge transition of the clock signal on clock line CLK, thereby indicating that rename buffer 0 is not allocated to any of GPR's 30.

Notably, if shift1 is asserted (indicating the instruction in buffer I1 is not being dispatched), then allocated_0 does not reflect an indication by I1Rt_alloc_0 or I1Ra_alloc_0 that rename buffer 0 is allocated. Accordingly, a NOR-gate 124 inputs allocated_0 and the outputs of latches 112a–d. If any of these inputs is true, then $\overline{alloc0}$ is cleared; otherwise, $\overline{alloc0}$ is set. In this manner, $\overline{alloc0}$ indicates to RAA 100 whether rename buffer 0 is allocated in response to an instruction, irrespective of whether the instruction is dispatched or not dispatched.

The outputs of latches 112a–d are output to instruction decoder 38 (FIG. 1) through lines 122_0. Likewise, fixed point STAM 42 outputs lines 122_1–122_4 (FIG. 1) to instruction decoder 38 from control units BFR1–BFR4, respectively. For clarity, lines 122_1–122_4 are not shown in FIG. 5.

Lines 122_0–122_4 indicate to instruction decoder 38 whether fixed point STAM 42 has allocated a rename buffer in response to assertion by instruction decoder 38 of one or more of I0Rt_rq, I0Ra_rq, I1Rt_rq and I1Ra_rq. In response to such indications from fixed point STAM 32 through lines 122_0–122_4, instruction decoder 38 clears any previously asserted one of I0Rt_rq, I0Ra_rq, I1Rt_rq and I1Ra_rq for which fixed point STAM 42 has allocated a rename buffer. In this manner, fixed point STAM avoids redundant allocation of multiple rename buffers in response to a single request from instruction decoder 38.

Referring also to FIG. 5, as control unit BFR0 outputs lines I0Rt_alloc_0, I0Ra_alloc_0, I1Rt_alloc_0, and I1Ra_alloc_0, likewise each of control units BFR1–BFR4 outputs lines I0Rt_alloc_n, I0Ra_alloc_n, I1Rt_alloc_n, and I1Ra_alloc_n (where n=1 for BFR1, n=2 for BFR2, n=3 for BFR3, and n=4 for BFR4). Referring to FIG. 5, 5-bit destination tag I0Rt is formed by bundling lines I0Rt_ alloc_0, I0Rt_alloc_1, I0Rt_alloc_2, I0Rt_alloc_3 and I0Rt_alloc_4. Similarly, 5-bit destination tags I0Ra, I1Rt and I1Ra are formed by bundling lines I0Ra_alloc_n, I1Rt_alloc_n, and I1Ra_alloc_n, respectively (where n=[0 . . . 4]).

Referring also to FIG. 1, destination tags I0Rt, I0Ra, I1Rt and I1Ra are output from fixed point STAM 42 to fixed point unit 20 and to load/store unit 22 through lines 128. For example, if fixed point STAM 42 outputs a destination tag I0Rt=10000 while fixed point unit 20 executes an instruction from buffer I0 (FIG. 3), then fixed point unit 20 stores the instruction's $R_T$ result data in rename buffer 0 (FIG. 2) of fixed point rename buffers 26. Moreover, control unit BFR0 of fixed point STAM 42 associates allocated rename buffer 0 with the register number specified in the instruction's $R_T$ register field, as discussed further hereinabove in connection with register address value latch 113.

Figure 8:
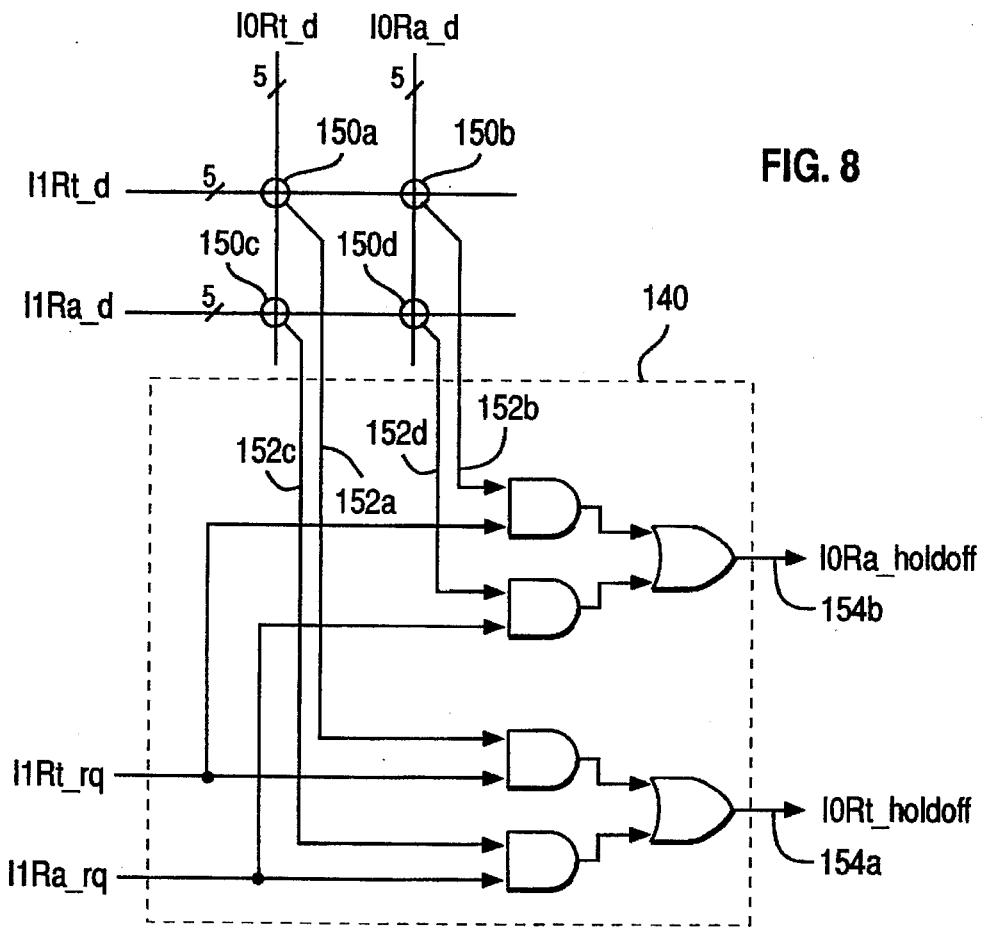
FIG. 8 is a schematic electrical circuit diagram of a hold-off generate unit of the STAM of FIG. 5.

FIG. 8 is a schematic electrical circuit diagram of a hold-off generate unit 140 of fixed point STAM 42. Normally, control unit BFR0 sets its MRAbit when it allocates its associated rename buffer 0 (FIG. 2) to store data for a particular one of GPR's 30 in response to a dispatched instruction. Nevertheless, with hold-off generate unit 140, fixed point STAM 42 accommodates a situation where (1) the I1 instruction is dispatched before or together with the I0 instruction and (2) the I0 and I1 instructions each have a common destination register specified in either $R_T$ register field 64 (FIG. 4) or $R_A$ register field 66.

For example, if

I0 instruction is: instr. code, R3, R4, R5

I1 instruction is: instr. code, R3, R6, R7 then register number 3 (i.e. R3) is specified in $R_T$ register field 64 of both the I0 and I1 instructions. In such a situation, if control unit BFR0 allocates rename buffer 0 to store data for register R3 in response to dispatched instruction I0, then control unit BFR0 does not set its MRA bit. This is because a different rename buffer is allocated by fixed point STAM 42 to store data for register R3 in response to the previously or simultaneously dispatched I1 instruction. Since the I1 instruction follows the I0 instruction in sequence, this different rename buffer is designated by fixed point STAM 42 as the "most recently allocated" rename buffer storing data for register R3.

Accordingly, FIG. 5 and FIG. 8 show four comparators 150a–d and their respective outputs 152a–d. Referring to FIG. 8, comparator 150a asserts output 152a in response to a match between I0Rt_d and I1Rt_d. Similarly, comparator 150b asserts output 152b in response to a match between I0Ra_d and I1Rt_d. Also, comparator 150c asserts output 152c in response to a match between I0Rt_d and I1Ra_d. Moreover, comparator 150d asserts output 152d in response to a match between I0Ra_d and I1Ra_d.

If I1Rt_rq is true (indicating a valid $R_T$ field 64 of an instruction in buffer I1) and output 152a is asserted, then hold-off generate unit 140 asserts I0Rt_holdoff 154a. Similarly, if I1Rt_rq is true and output 152b is asserted, then holdsoff generate unit 140 asserts I0Ra_holdoff 154b. Also, if I1Ra_rq is true (indicating a valid $R_A$ field 66 of an instruction in buffer I1) and output 152c is asserted, then hold-off generate unit 140 asserts I0Rt_holdoff 154a. Moreover, if I1Ra_rq is true and output 152d is asserted, then hold-off generate unit 140 asserts I0Ra_holdoff 154b.

Figure 9:
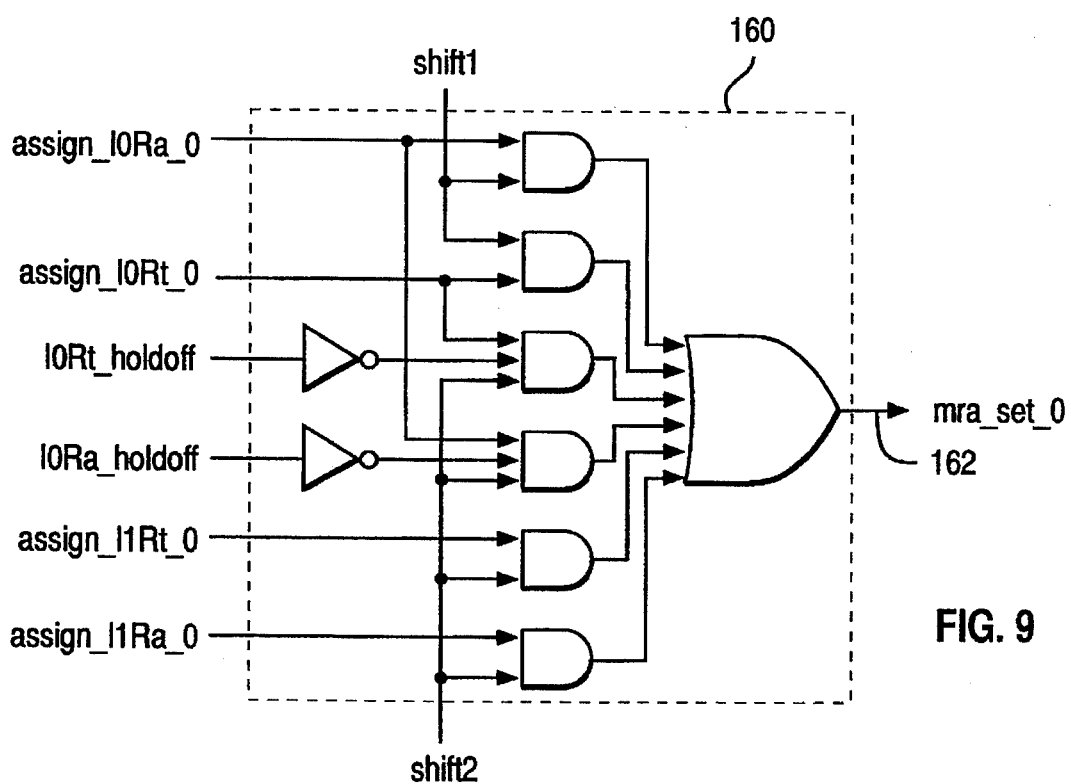
FIG. 9 is a schematic electrical circuit diagram of most recently allocated ("MRA") set logic of the STAM of FIG. 5.

FIG. 9 is a schematic electrical circuit diagram of MRA set logic 160 of Destination Compares and MRA Set Logic 104. As shown in FIG. 5, Destination Compares and MRA Set Logic 104 inputs I0Rt_holdoff 154a and I0Ra_holdoff 154b from hold-off generate unit 140.

Referring to FIG. 9, MRA set logic 160 asserts mra_set_0 if:

(1) assign_I0Rt_0 is true and shift1 is true;
(2) assign_I0Ra_0 is true and shift1 is true;
(3) assign_I1Rt_0 is true and shift2 is true; or
(4) assign_I1Ra_0 is true and shift2 is true.

Moreover, MRA set logic 160 asserts mra_set_0 if:

(1) assign_I0Rt_0 is true and shift2 is true (unless I0Rt_holdoff is true); or
(2) assign_I0Ra_0 is true and shift2 is true (unless I0Ra_holdoff is true).

Accordingly, if the I0 instruction is dispatched after or together with the I1 instruction (indicated by assertion of shift2), and if the I0 and I1 instructions each have a common destination register specified in either the $R_T$ or $R_A$ register fields, and if control unit BFR0 allocates rename buffer 0 to store data for the common destination register in response to dispatched instruction I0, then control unit BFR0 does not set its MRA bit. Instead, a different control unit of fixed point STAM 42 allocates a different rename buffer to store data for the common destination register in response to dispatched instruction I1, and this different control unit sets its MRA bit.

Referring also to FIG. 5, MRA set logic 160 outputs mra_set_0 as line 162 to an MRA latch 164. In response to assertion of mra_set_0, MRA latch 164 sets MRA bit 166.

Figure 10:
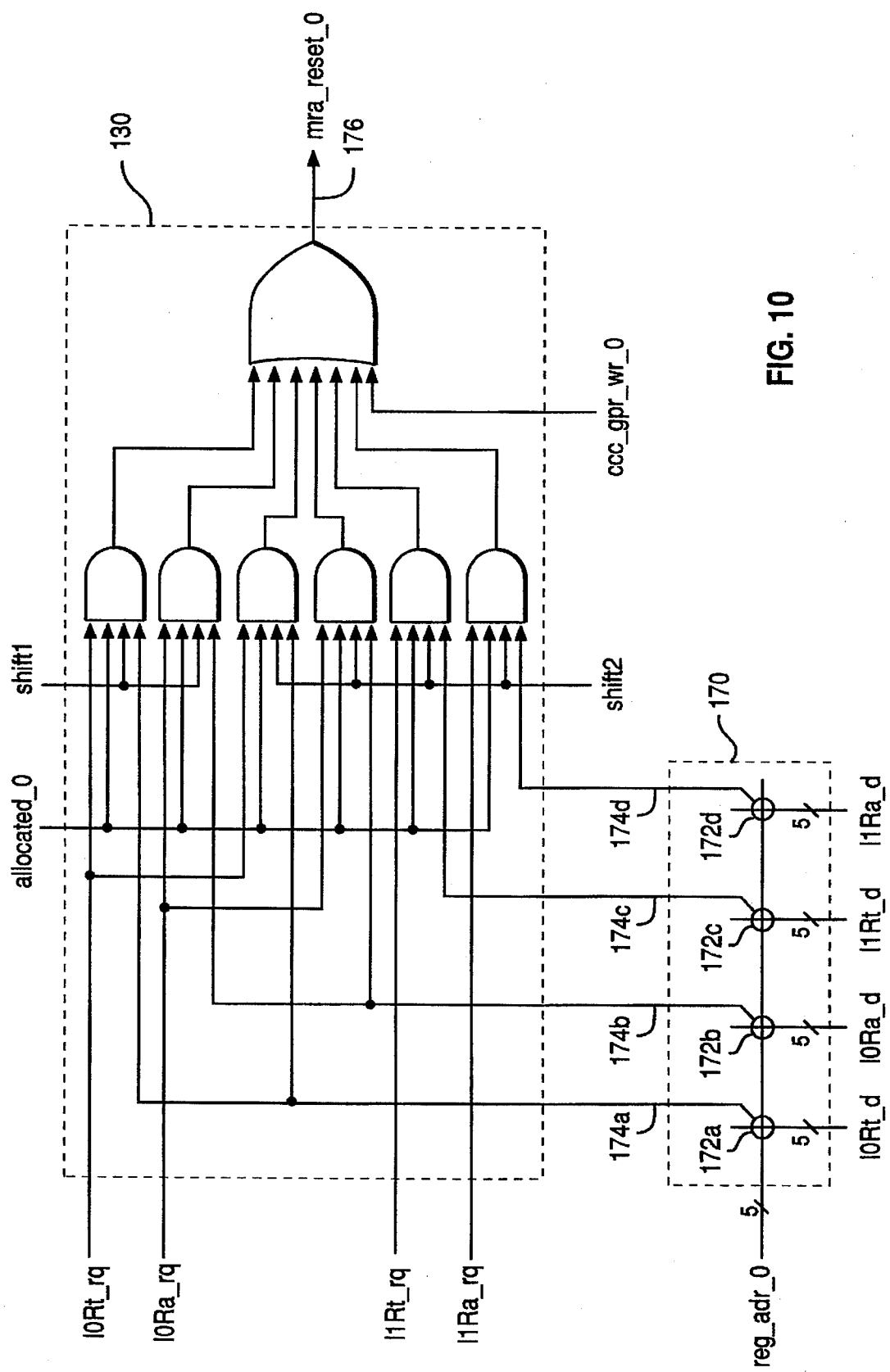
FIG. 10 is a schematic electrical circuit diagram of MRA reset logic of the STAM of FIG. 5.

FIG. 10 is a schematic electrical circuit diagram of MRA reset logic 130 of fixed point STAM 42. Further, FIG. 10 shows destination compares logic 170 of Destination Compares and MRA Set Logic 104. As shown in FIGS. 5 and 10, destination compares logic 170 inputs the latched register number from register address value latch 113 as reg_adr_0. Moreover, destination compares logic 170 inputs I0Rt_d, I0Ra_d, I1Rt_d and I1Ra_d.

Notably, the MRA reset logic of each of control units BFR0–BFR4 inputs request lines I0Rt_rq, I0Ra_rq, I1Rt_rq and I1Ra_rq from instruction decoder 38 (FIG. 1). Also, the MRA reset logic of each of control units BFR0–BFR4 inputs shift1, shift2, allocated_n, and ccc_gpr_wr_n (where n=1 for BFR1, n=2 for BFR2, n=3 for BFR3, and n=4 for BFR4).

Control unit BFR0 clears its MRA bit in response to any of three situations. In the first situation, ccc_gpr_wr_0 is asserted by completion logic 40 as discussed further hereinabove in connection with FIG. 1 and FIG. 5. In the second situation, the I0 instruction is dispatched, and the dispatched I0 instruction has a valid destination register equal to the GPR register number associated by control unit BFR0 with allocated rename buffer 0. In the third situation, the I0 instruction is dispatched after or together with the I1 instruction, and the dispatched I1 instruction has a valid destination register equal to the GPR register number associated by control unit BFR0 with allocated rename buffer 0.

Accordingly, destination compares logic 170 includes four comparators 172a–d. If reg_adr_0 matches I0Rt_d, then comparator 172a sets line 174a to MRA reset logic 130. Similarly, if reg_adr_0 matches I0Ra_d, then comparator 172b sets line 174b to MRA reset logic 130. Also, if reg_adr_0 matches I1Rt_d, then comparator 172c sets line 174c to MRA reset logic 130. Moreover, if reg_adr0 matches I1Ra_d, then comparator 172d sets line 174d to MRA reset logic 130.

MRA reset logic 130 asserts mra_reset_0 if allocated_0 is true and:

(1) line 174a is true, shift1 is true, and I0Rt_rq is true;
(2) line 174a is true, shift2 is true, and I0Rt_rq is true;
(3) line 174b is true, shift1 is true, and I0Ra_rq is true;
(4) line 174b is true, shift2 is true, and I0Ra_rq is true;
(5) line 174c is true, shift2 is true, and I1Rt_rq is true; or
(6) line 174d is true, shift2 is true, and I1Ra_rq is true.

Moreover, MRA reset logic 130 asserts mra_reset_0 if ccc_gpr_wr_0 is true. Referring also to FIG. 5, MRA reset logic 130 outputs mra_reset_0 as line 176 to MRA latch 164. In response to assertion of mra_reset_0, MRA latch 164 clears MRA bit 166.

Referring to FIG. 5, fixed point STAM 42 includes source compares logic 190. Source compares logic 190 inputs the latched register number from register address value latch 113 as reg_adr_0. Moreover, source compares logic 190 inputs I0Ra_s, I0Rb_s, I1Ra_s, and I1Rb_s.

Source compares logic 190 compares reg_adr_0 with I0Ra_s, with I0Rb_s, with I1Ra_s, and with I1Rb_s. In response to a match between reg_adr_0 and I0Ra_s, source compares logic 190 asserts a line to an AND gate 192a, so that AND gate 192a asserts a line I0Ra_source_0 if MRA bit 166 is set. Similarly, in response to a match between reg_adr_0 and I0Rb_s, source compares logic 190 asserts a line to an AND gate 192b, so that AND gate 192b asserts a line I0Rb_source_0 if MRA bit 166 is set.

In addition to lines I0Ra_source_0 and I0Rb_source_0, control unit BFR0 further outputs lines I1Ra_source_0 and I1Rb_source_0 from multiplexers 194a–b, respectively. Multiplexers 194a–b are discussed further hereinbelow in connection with FIG. 11.

As control unit BFR0 outputs lines I0Ra_source_0, I0Rb_source_0, I1Ra_source_0 and I1Rb_source_0, likewise each of control units BFR1–BFR4 outputs lines I0Ra_source_n, I0Rb_source_n, I1Ra_source_n and I1Rb_source_n (where n=1 for BFR1, n=2 for BFR2, n=3 for BFR3, and n=4 for BFR4). A 5-bit source tag I0Ra is formed by bundling lines I0Ra_source_0, I0Ra_source_

1, I0Ra_source_2, I0Ra_source_3 and I0Ra_source_4. Similarly, 5-bit source tags I0Rb, I1Ra and I1Rb are formed by bundling lines I0Rb_source_n, I1Ra_source_n, and I1Rb_source_n, respectively (where n=[0 . . . 4]).

Referring also to FIG. 1, source tags I0Ra, I0Rb, I1Ra and I1Rb are output from fixed point STAM 42 to fixed point unit 20 and to load/store unit 22 through lines 198. In this manner, fixed point STAM 42 indicates whether a most recently allocated one of fixed point rename buffers 26 stores data for a register number specified in an instruction's $R_A$ register field or $R_B$ register field. Accordingly, if multiple rename buffers store data for the specified register number, then fixed point STAM 42 indicates only the most recently allocated one of the rename buffers.

For example, if fixed point STAM 42 outputs a source tag I0Ra=00100 while fixed point unit 20 executes an instruction from buffer I0 (FIG. 3), then fixed point unit 20 inputs the instruction's Ra source data from rename buffer 2 (FIG. 2) of fixed point rename buffers 26. As another example, if fixed point STAM 42 outputs a source tag I0Ra=00000 while fixed point unit 20 executes an instruction from buffer I0 (FIG. 3), then fixed point unit 20 inputs the instruction's $R_A$ source data from the one of GPR's 30 specified in the instruction's $R_A$ register field.

Figure 11:
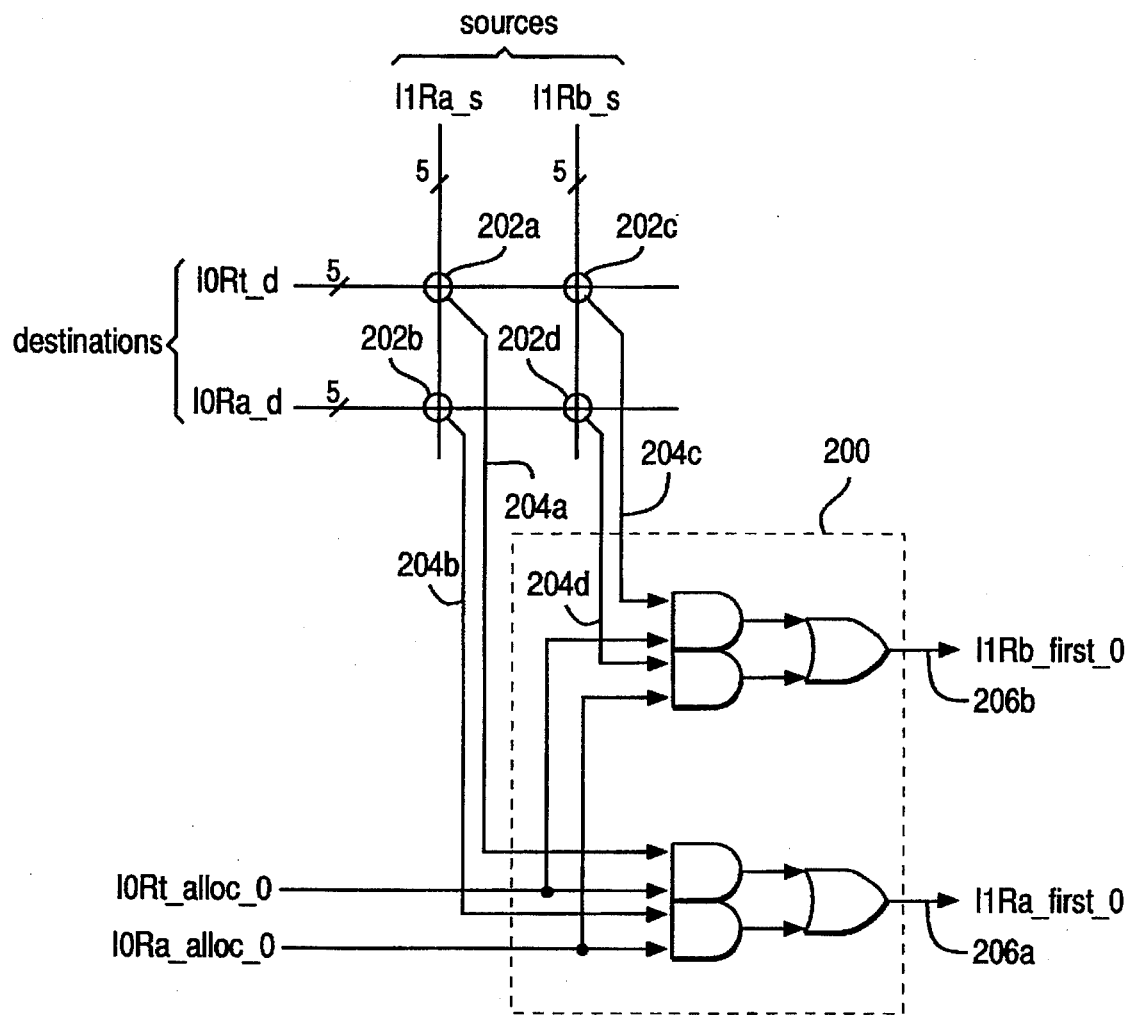
FIG. 11 is a schematic electrical circuit diagram of a priority assign unit of the STAM of FIG. 5.

FIG. 11 is a schematic electrical circuit diagram of a priority assign unit 200 of fixed point STAM 42. With priority-assign unit 200, fixed point STAM 42 accommodates a situation where (1) the I1 instruction is dispatched before or together with the I0 instruction and (2) the I0 instruction has a destination register which also is a source register for the I1 instruction.

For example, if

I0 instruction is: instr. code, R3, R4, R5
I1 instruction is: instr. code, R8, R6, R3 then register number 3 (i.e. R3) is specified in the I0 instruction's $R_T$ destination register field and also in the I1 instruction's $R_B$ source register field. In such a situation, fixed point STAM 42 does not allocate a rename buffer to store data for register R3 (in response to dispatched instruction I0) prior to the dispatch of instruction I1. This is because the I1 instruction is dispatched before or together with the I0 instruction.

Moreover, in response to the dispatched I0 instruction, fixed point STAM 42 allocates a rename buffer to store data for the I0 instruction's destination register. This allocated rename buffer is the most recently allocated one of fixed point rename buffers 26, and it stores the most recent version of data for the I1 instruction's source register.

Advantageously, fixed point STAM 42 indicates whether a most recently allocated one of fixed point rename buffers 26 stores data for a register number specified in the I1 instruction's $R_A$ register field or $R_B$ register field, even if the I1 instruction is dispatched before or together with the I0 instruction, and even if the I0 instruction's destination register also is a source register for the I1 instruction.

Accordingly, FIG. 5 and FIG. 11 show four comparators 202a–d and their respective outputs 204a–d. Referring to FIG. 11, comparator 202a asserts output 204a in response to a match between I1Ra_s and I0Rt_d. Similarly, comparator 202b asserts output 204b in response to a match between I1Ra_s and I0Ra_d. Also, comparator 202c asserts output 204c in response to a match between I1Rb_s and I0Rt_d. Moreover, comparator 202d asserts output 204d in response to a match between I1Rb_s and I0Ra_d.

If I0Rt_alloc_0 is true (indicating control unit BFR0 is allocating rename buffer 0 to store data for a valid $R_T$ field 64 of an instruction in buffer I0) and output 204a is true (indicating a match between I1Ra_s and I0Rt_d), then priority assign Knit 200 asserts I1Ra_first_0 206a. Similarly, if I0Ra_alloc_0 is true (indicating control unit BFR0 is allocating rename buffer 0 to store data for a valid $R_A$ field 66 of an instruction in buffer I0) and output 204b is true (indicating a match between I1Ra_s and I0Ra_d), then priority assign unit 200 asserts I1Ra_first_0 206a.

Also, if I0Rt_alloc_0 is true and output 204c is true (indicating a match between I1Rb_s and I0Rt_d), then priority assign unit 200 asserts I1Rb_first_0 206b. Moreover, if I0Ra_alloc_0 is true and output 204d is true (indicating a match between I1Rb_s and I0Ra_d), then priority assign unit 200 asserts I1Rb_first_0 206b.

Referring again to FIG. 5, in response to a match between reg_adr_0 and I1Ra_s, source compares logic 190 asserts a line to an AND gate 192c, so that AND gate 192c asserts I1Ra_second_0 208a if MRA bit 166 is set. Moreover, in response to a match between reg_adr_0 and I1Rb_s, source compares logic 190 asserts a line to an AND gate 192d, so that AND gate 192d asserts I1Rb_second_0 208b if MRA bit 166 is set.

As control unit BFR0 outputs lines I1Ra_first_0 and I1Rb_first_0, likewise each of control units BFR1–BFR4 outputs lines I1Ra_first_n and I1Rb_first_n (where n=1 for BFR1, n=2 for BFR2, n=3 for BFR3, and n=4 for BFR4). An OR gate 210a inputs lines I1Ra_first_0, I1Ra_first_1, I1Ra_first_2, I1Ra_first_3 and I1Ra_first_4. Similarly, an OR gate 210b inputs lines I1Rb_first_0, I1Rb_first_1, I1Rb_first_2, I1Rb_first_3 and I1Rb_first_4.

If any of lines I1Ra_first_n (where n=[0 . . . 4]) is true (indicating fixed point STAM 42 is allocating a rename buffer to store data for the I0 instruction's destination register which also is an Ra source register for the I1 instruction), then an output S1 of OR gate 210a is true. If S1 is true, then multiplexer 194a outputs I1Ra_first_0 as I1Ra_source_0. Otherwise, multiplexer 194a outputs I1Ra_second_0 as I1Ra_source_0.

Similarly, if any of lines I1Rb_first_n (where n=[0 . . . 4]) is true (indicating fixed point STAM 42 is allocating a rename buffer to store data for the I0 instruction's destination register which also is an Rb source register for the I1 instruction), then an output S2 of OR gate 210b is true. If S2 is true, then multiplexer 194b outputs I1Rb_first_0 as I1Rb_source_0. Otherwise, multiplexer 194a outputs I1Rb_second_0 as I1Rb_source_0.

In this manner, fixed point STAM 42 indicates whether a most recently allocated one of fixed point rename buffers 26 stores data for a register number specified in the I1 instruction's $R_A$ register field or $R_B$ register field, even if the I1 instruction is dispatched before or together with the I0 instruction, and even if the I0 instruction's destination register also is a source register for the I1 instruction.

Referring again to FIG. 1, in response to a writeback signal on line 85a from completion logic 40 and a Writeback address on lines 87a from fixed point STAM 42, data from a selected one of fixed point rename buffers 26 are written back to one of GPR's 30. The write-back address indicates which of GPR's 30 is to store data input from the selected one of fixed point rename buffers 26, according to the register associated by fixed point STAM 42 with the selected one of fixed point rename buffers 26.

Accordingly, referring also to FIG. 5, completion logic 40 outputs 5-bit write-back requests ccc_wrt and ccc_win through lines 220a and 220b, respectively. Write-back requests ccc_wrt 220a and ccc_win 220b are input by a write-back arbitration unit 222 of fixed point STAM 42. Further, arbitration unit 222 inputs reg_adr_0 from control unit BFR0. Likewise, arbitration unit 222 inputs reg_adr_1 from control unit BFR1, reg_adr_2 from control unit BFR2, reg_adr_3 from control unit BFR3, and reg_adr_4 from control unit BFR4.

Advantageously, arbitration unit 222 is able to output two 5-bit write-back addresses, wb0 and wb1, on lines 87a. Through write-back request ccc_wrt 220a, completion logic 40 selects two of fixed point rename buffers 26 to be written back to GPR's 30. Each of the 5-bits of ccc_wrt 220a is associated with a respective one of rename buffers 0–4 of fixed point rename buffers 26. For example, if ccc_wrt 220a=00101, then data from rename buffer 2 and rename buffer 4 are to be written back to GPR's 30. As another example, if ccc_wrt 220a=11000, then data from rename buffer 0 and rename buffer 1 are to be written back to GPR's 30.

In response to ccc_wrt 220a, arbitration logic 222 multiplexes two of the five reg_adr_n (where n=[0 ... 4]) onto lines 87a as wb0 and wb1. GPR's 30 input wb0 and wb1. In this manner, wb0 and wb1 indicate two of GPR's 30 for storing data input from the two fixed point rename buffers selected by completion logic 40. The two indicated GPR's are the registers associated by fixed point STAM 42 with the two selected fixed point rename buffers.

It is possible for write-back request ccc_wrt 220a to select two rename buffers storing data for the same GPR (although only one of the two rename buffers is most recently allocated). Through write-back request ccc_win 220b, completion logic 40 specifies which of the two ccc_wrt-selected rename buffers is to be written back to GPR's 30 in such a situation. Like ccc_wrt 220a, each of the 5-bits of ccc_win 220b is associated with a respective one of rename buffers 0–4 of fixed point rename buffers 26. For example, if ccc_wrt 220a=01010 and ccc_wtn 220b=00010, and if reg_adr_1=reg_adr_3, then arbitration logic 222 multiplexes only reg_adr_3 (specified by ccc_win 220b) onto lines 87a as wb0. In this example, write-back address wb1 is a null address of 00000.

Although an exemplary embodiment of the present invention and its advantages have been described in detail hereinabove, they have been described as example and not as limitation. Various changes, substitutions and alterations can be made in the exemplary embodiment without departing from the breadth, scope and spirit of the present invention. The breadth, scope and spirit of the present invention should not be limited by the exemplary embodiment, but should be defined only in accordance with the following claims and equivalents thereof.

What is claimed is:

1. A processing system, comprising:
   a register for storing information;
   at least one execution unit for processing said information in response to an instruction specifying said register;
   N buffers coupled to said execution unit for storing said information, wherein N is a integer number greater than one; and
   N control units coupled to said execution unit, said N control units being cascadably connected to one another and respectively associated with said N buffers, and each for selectively allocating only its respectively associated buffer to store said information in response to said instruction.

2. The system of claim 1 wherein each said control unit indicates to said execution unit whether said information is to be read from its respectively associated buffer.

3. The system of claim 1 wherein each said control unit indicates to said execution unit whether said information is to be stored in its respectively associated buffer.

4. The system of claim 1 wherein said instruction follows an additional instruction in a programmed sequence.

5. The system of claim 4 wherein said additional instruction specifies said register.

6. The system of claim 5 wherein said instruction and said additional instruction specify said register as a destination register.

7. The system of claim 6 wherein a first control unit allocates its respectively associated buffer to store said information in response to said instruction, and a second control unit allocates its respectively associated buffer to store said information in response to said additional instruction, such that said control units indicate which of said buffers is most recently allocated to store said information.

8. The system of claim 7 wherein said instruction is dispatched to said execution unit no later than dispatch of said additional instruction, such that said first control unit indicates its respectively associated buffer is most recently allocated to store said information.

9. The system of claim 5 wherein said instruction specifies said register as a source register, and said additional instruction specifies said register as a destination register.

10. The system of claim 9 wherein a particular control unit allocates its respectively associated buffer to store said information in response to said additional instruction, such that said particular control unit indicates to said execution unit to read said information from its respectively associated buffer.

11. The system of claim 10 wherein said instruction is dispatched to said execution unit no later than dispatch of said additional instruction.

12. A method of operating a processing system, comprising the steps of:
   processing information of a register with at least one execution unit in response to an instruction specifying said register; and
   selectively allocating, with each of N control units cascadably connected to one another and respectively associated with N buffers, only its respectively associated buffer to store said information in response to said instruction, wherein N is an integer number greater than one.

13. The method of claim 12 and further comprising the step of indicating, with each said control unit, to said execution unit whether said information is to be read from its respectively associated buffer.

14. The method of claim 12 and further comprising the step of indicating, with each said control unit, to said execution unit whether said information is to be stored in its respectively associated buffer.

15. The method of claim 12 wherein said processing step comprises the step of processing said information in response to said instruction, said instruction following an additional instruction in a programmed sequence, and said instruction and said additional instruction specifying said register as a destination register.

16. The method of claim 15 wherein said selectively allocating step comprises the steps of:
   allocating, with a first control unit, its respectively associated buffer to store said information in response to said instruction; and
   allocating, with a second control unit, its respectively associated buffer to store said information in response to said additional instruction, such that said control units indicate which of said buffers is most recently allocated to store said information.

17. The method of claim 16 and further comprising the step of dispatching said instruction to said execution unit no later than dispatch of said additional instruction, such that said first control unit indicates its respectively associated buffer is most recently allocated to store said information.

18. The method of claim 15 wherein said processing step comprises the step of processing said information in response to said instruction, said instruction following an additional instruction in a programmed sequence, said instruction specifying said register as a source register, and said additional instruction specifying said register as a destination register.

19. The method of claim 18 wherein said selectively allocating step comprises the step of allocating, with a particular control unit, its respectively associated buffer to store said information in response to said additional instruction, such that said particular control unit indicates to said execution unit to read said information from its respectively associated buffer.

20. The method of claim 19 and further comprising the step of dispatching said instruction to said execution unit no later than dispatch of said additional instruction.

21. A processing system, comprising:

a register for storing information;

at least one execution unit for processing said information in response to first and second instructions specifying said register as a destination register;

first and second buffers coupled to said execution unit for storing said information;

a first control unit coupled to said execution unit and to said first buffer for selectively allocating only said first buffer to store said information in response to said first instruction; and a second control unit coupled to said execution unit and to said second buffer for selectively allocating only said second buffer to store said information in response to said second instruction, such that said first and second control units indicate which of said first and second buffers is most recently allocated to store said information.

22. The system of claim 21 wherein said first instruction follows said second instruction in a programmed sequence, and said first instruction is dispatched to said execution unit no later than dispatch of said second instruction, such that said first control unit indicates said first buffer is most recently allocated to store said information.

23. A method of operating a processing system, comprising the steps of:

processing information of a register with at least one execution unit in response to first and second instructions specifying said register as a destination register;

selectively allocating, with a first control unit, only a first buffer to store said information in response to said first instruction; and selectively allocating, with a second control unit, only a second buffer to store said information in response to said second instruction, such that said first and second control units indicate which of said first and second buffers is most recently allocated to store said information.

24. The method of claim 23 and further comprising the step of dispatching said first instruction to said execution unit no later than dispatch of said second instruction, such that said first control unit indicates said first buffer is most recently allocated to store said information, said first instruction following said second instruction in a programmed sequence.

* * * * *